United States Patent
Ostrovsky-Berman et al.

(10) Patent No.: US 10,217,238 B2
(45) Date of Patent: Feb. 26, 2019

(54) SOFT TISSUE SEGMENTATION USING A BONE ATLAS

(75) Inventors: Yaron Ostrovsky-Berman, Petach-Tikva (IL); Hadar Porat, Tel-Aviv (IL); Tiferet Ahavah Gazit, Tel-Aviv (IL)

(73) Assignee: Algotec Systems Ltd., RaAnana (IL)

( * ) Notice: Subject to any disclaimer, the term of this patent is extended or adjusted under 35 U.S.C. 154(b) by 1238 days.

(21) Appl. No.: 12/783,590

(22) Filed: May 20, 2010

(65) Prior Publication Data

US 2010/0296718 A1 Nov. 25, 2010

Related U.S. Application Data

(60) Provisional application No. 61/179,783, filed on May 20, 2009.

(51) Int. Cl.
| | | |
|---|---|---|
| *G06T 7/187* | (2017.01) | |
| *G06T 7/66* | (2017.01) | |
| *G06T 7/62* | (2017.01) | |

(52) U.S. Cl.
CPC ............... *G06T 7/66* (2017.01); *G06T 7/187* (2017.01); *G06T 7/62* (2017.01); *G06T 2207/10081* (2013.01); *G06T 2207/20072* (2013.01); *G06T 2207/20128* (2013.01); *G06T 2207/30101* (2013.01)

(58) Field of Classification Search
USPC ........................................................ 382/131
See application file for complete search history.

(56) References Cited

U.S. PATENT DOCUMENTS

| | | | | |
|---|---|---|---|---|
| 6,754,376 | B1* | 6/2004 | Turek et al. | 382/131 |
| 7,259,762 | B2* | 8/2007 | Tanacs et al. | 345/424 |
| 7,953,266 | B2* | 5/2011 | Gulsun et al. | 382/131 |
| 2005/0276455 | A1* | 12/2005 | Fidrich | G06T 7/0083 382/128 |
| 2006/0062425 | A1* | 3/2006 | Shen | G06T 15/08 382/100 |
| 2006/0228009 | A1* | 10/2006 | Fidrich | G06T 7/12 382/128 |
| 2007/0053589 | A1* | 3/2007 | Gering | 382/173 |
| 2007/0109299 | A1 | 5/2007 | Peterson | |
| 2008/0317308 | A1* | 12/2008 | Wu | G06K 9/4638 382/128 |
| 2009/0226060 | A1* | 9/2009 | Gering et al. | 382/128 |
| 2010/0098309 | A1* | 4/2010 | Graessner | G06K 9/00 382/131 |

(Continued)

OTHER PUBLICATIONS

Frangi et al. "Multiscale Vessel Enhancement Filtering", Medical Image Computing and Computer-Assisted Intervention—MICCAI'98, Lecture Notes in Computer Science, 1496: 130-137, 1998.

(Continued)

*Primary Examiner* — Lena Najarian

(57) ABSTRACT

A method of segmenting one or more soft tissue organs in a 3-D medical image includes registering the image to a bone atlas which also lists landmarks of the organs. Voxels of the image are identified as corresponding to listed landmarks of the organs, based on their position relative to one or more known bones in the registered image. At least one organ is segmented using at least one of the voxels identified as belonging to that organ as a starting point.

24 Claims, 11 Drawing Sheets

(56) References Cited

U.S. PATENT DOCUMENTS

2010/0260396 A1* 10/2010 Brandt et al. ................. 382/131
2010/0310146 A1* 12/2010 Higgins ................ G06T 7/0083
                                                                                     382/131

OTHER PUBLICATIONS

Bencher "The Watershed Transformation Applied to Image Segmentation", SPIE, p. 1-26, 1990.
Sethian "Fast Marching Methods", SIAM Review, p. 1-55, Nov. 1998.
Szymczak et al. "Coronary Vessel Cores From 3D Imagery: A Topological Approach", SPIE, 9 P., 2005.
Zhang et al. "3D Interactive Centerline Extraction", Midas Journal, 583: 1-7, Jul. 3, 2008.

* cited by examiner

SOFT TISSUE SEGMENTATION USING A BONE ATLAS

RELATED APPLICATIONS

This application claims benefit under 35 USC 119(e) of U.S. Provisional Patent Application No. 61/179,783 filed on May 20, 2009. The contents of that application are incorporated by reference as if fully set forth herein.

FIELD AND BACKGROUND OF THE INVENTION

The present invention, in some embodiments thereof, relates to soft tissue segmentation of a medical image and, more particularly, but not exclusively, to segmentation of arteries and other organs located close to bones.

Analysis of soft tissues in medical images, such as blood vessels, airways, and organs such as the liver and spleen, can be difficult due to variability in the shape and location of the organs. Segmentation tools can provide meaningful 3-D views, automatic measurements, and data reformatting for better understanding of anatomy. However, prior art segmentation tools have generally required at least some manual user input, as described by Zhang et al, "3D Interactive Centerline Extraction," Midas Journal id 583 (2009), and each image can require a lot of time by skilled professionals, making it impractical to routinely segment large numbers of medical images.

U.S. Pat. No. 6,754,376 to Turek, describes automatically segmenting a 3-D substructure, such as a coronary tree, starting with a manually chosen seed point.

US2007/0109299 to Peterson describes automatically finding the centerline of a tube-like object in a 3-D medical image.

Other prior art on segmentation of medical images is described in earlier patent applications assigned to Algotec, Ltd., including PCT/IL2004/001169, "Vessel Centerline Determination," and US2007/0081702, "Method and System for Processing an Image of Body Tissue."

SUMMARY OF THE INVENTION

An aspect of some embodiments of the invention concerns a method of segmenting one or more soft tissue organs in a medical image, by using the spatial relationship of the organ to a bone which can identified from an atlas.

There is thus provided, in accordance with an exemplary embodiment of the invention, a method of segmenting one or more soft tissue organs in a 3-D medical image, the method comprising:
a) registering the image to a bone atlas which also lists landmarks of the organs;
b) identifying a plurality of voxels as corresponding to listed landmarks of the organs, based on their position relative to one or more known bones in the registered image; and
c) segmenting at least one organ using at least one of the voxels identified as belonging to that organ as a starting point.

Optionally, the one or more organs comprise an artery.

Optionally, the one or more organs comprise one or more of an aorta, an iliac artery, a femoral artery, and a tibial artery.

Alternatively or additionally, the one or more organs comprise a liver.

Alternatively or additionally, the one or more organs comprise airways.

Alternatively or additionally, the one or more organs comprise a spinal canal.

Optionally, the one or more organs comprise a branching structure.

Optionally, identifying the plurality of voxels comprises, for at least one of the voxels, using one or more of dimensions, image density, shape, orientation and symmetry properties of the organ that the voxel is identified as corresponding to.

In an exemplary embodiment of the invention, the atlas lists path connections between the landmarks, and the method also comprises finding one or more paths in the image connecting voxels identified as corresponding to landmarks that are connected by path connections in the atlas.

Optionally, the method also comprises assigning a weight to each path according to an extent to which the image along the path has one or more properties expected if the path passes only through the organ or organs that those voxels were identified as belonging to.

Optionally, the method also comprises reviewing the identification of the voxels, and correcting the identification of a voxel if the weight of one or more paths connecting it indicates that the path does not pass only through the organ or organs that the voxels connected by the path were identified as belonging to.

Optionally, the method also comprises finding at least one path connecting two voxels that are identified as corresponding respectively to two landmarks that have a path connection to a third landmark in the atlas, even though said two landmarks do not have a path connection to each other in the atlas.

Optionally, the connections and landmarks listed in the atlas for one or more organs comprise a tree structure with each connection leading from a parent landmark to a child landmark.

Optionally, the method also comprises finding a path from at least one voxel identified with a landmark that has no child landmarks within the image, using an expansion algorithm that allows the path to extend in a range of directions that includes an average direction of a last part of the path before said voxel, but does not include the direction opposite to said average direction.

Optionally, the method also comprises displaying at least part of one of the paths to a user.

Optionally, the method also comprises:
a) registering a second 3-D medical image, showing an anatomical region at least partly corresponding to an anatomical region shown in the first image, to the bone atlas;
b) identifying in the second image a plurality of voxels corresponding to the same listed landmarks as those corresponding to identified voxels in the first image for which connecting paths were found;
c) finding one or more paths in the second image connecting said identified voxels in the second image; and
d) using at least one of the paths found in the second image that connects identified voxels in the second image, and the path found in the first image that connects the corresponding identified voxels in the first image, to register at least a portion of the second image to the first image.

Optionally, the method also comprises checking said segmentation of at least one organ, or checking another segmentation of at least one organ in the image, by checking to see whether at least one of the paths is entirely located within the segmentation that is being checked.

Optionally, segmenting the at least one organ comprises using at least one voxel on one of the paths found, between the connected voxels, as a seed voxel.

Optionally, the method also comprises:
a) registering a second 3-D medical image, showing an anatomical region at least partly corresponding to an anatomical region shown in the first image, to the bone atlas;
b) identifying in the second image a plurality of voxels corresponding to the same listed landmarks as those corresponding to identified voxels in the first image for which connecting paths were found; and
c) using at least one of the identified voxels in the second image, and the corresponding identified voxels in the first image, to register at least a portion of the second image to the first image.

Optionally, the atlas lists connections indicating relationships between properties of the landmarks, and the method also comprises:
a) assigning a weight to each connection according to how much said properties of the voxels identified as corresponding to said landmarks follow the relationship indicated in the atlas for that connection;
b) reviewing the identification of the voxels, correcting the identification of a voxel if the weight of one or more connections to it indicates that the properties of the voxels do not have the relationship that would be expected if the identifications were correct.

Optionally, the method also comprises, for at least one identified voxel, segmenting at least one additional organ that is connected to the organ to which the identified voxel belongs, by a path that is within the image.

Optionally, the method also comprises, for at least one identified voxel, segmenting at least one additional organ, adjacent to the organ to which the identified voxel belongs, or to an organ connected to that organ by a path that is within the image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
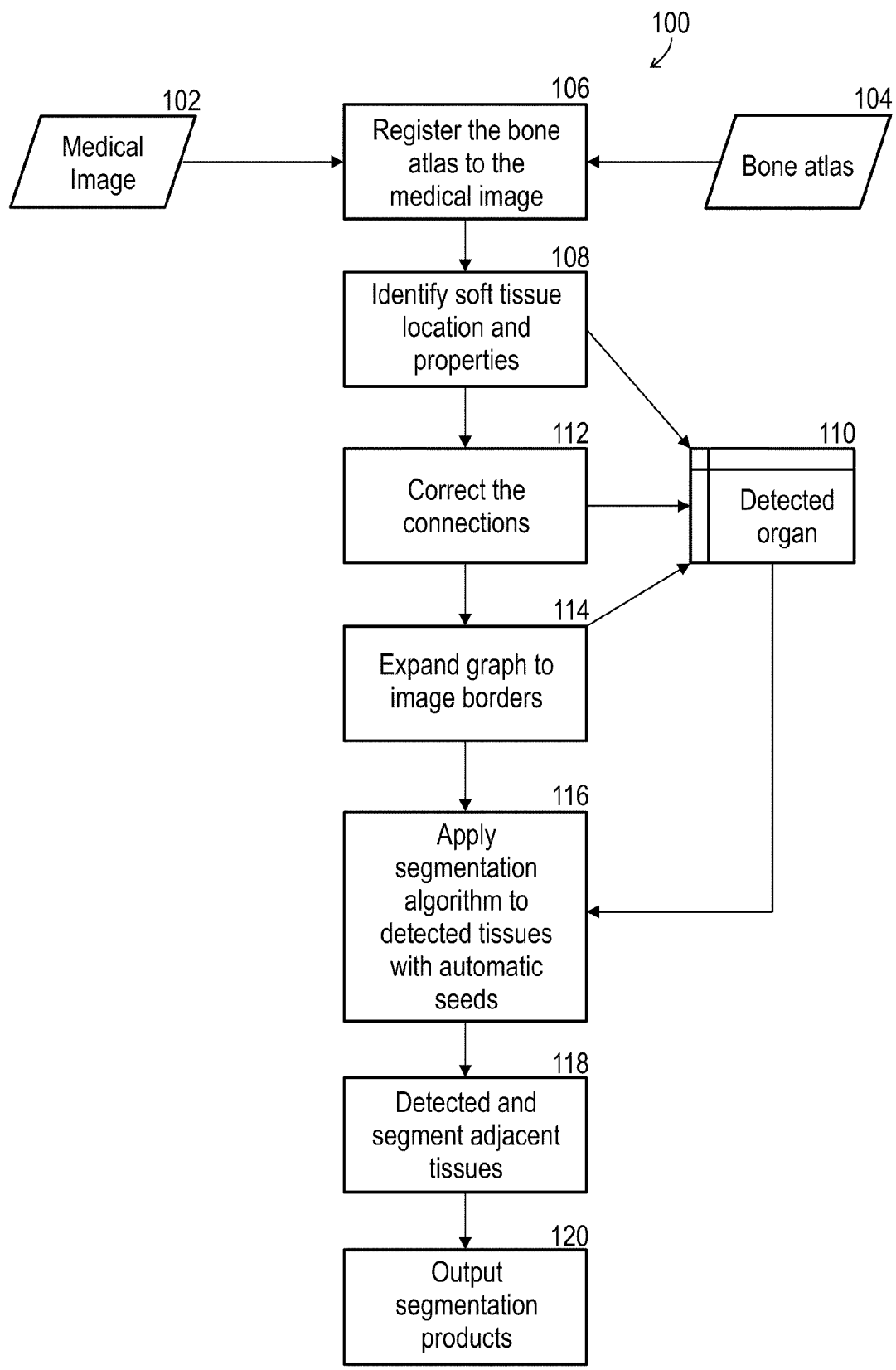
FIG. 1 is a flow chart for a method of segmenting soft tissue organs in a medical image, according to an exemplary embodiment of the invention.

The present invention, in some embodiments thereof, relates to soft tissue segmentation of a medical image and, more particularly, but not exclusively, to segmentation of arteries and other organs located close to bones.

An aspect of some embodiments of the invention concerns a method for segmenting soft-tissue organs in a medical image, using a bone atlas, and making use of the proximity of organ landmarks, listed in the atlas, to particular bones. As used herein, "atlas" need not refer to a single computer file, but the organ landmarks, and connections between them, are optionally listed in one or more supplementary files which are also considered part of the atlas. Once voxels are identified as belonging to an organ, they can be used as starting points for segmenting the organ, or for verifying a segmentation. As used herein, saying that a voxel is "identified as belonging to" an organ means that the voxel is identified as corresponding to a landmark of the organ listed in the atlas. Optionally, the organ comprises an artery, for example the aorta, the iliac artery, or the femoral artery, which are close to bones. Alternatively, the organ comprises airways, or a spinal channel, or the liver which is close to certain ribs. Optionally, the organ comprises a branching structure. Optionally, in addition to using the proximity of the organ landmark to a bone in order to identify it, one or more other properties of the organ are used, for example its density in the image, or its dimensions.

While the method can be used with any imaging modality, the inventors have developed and optimized it primarily for use with CT images, especially CT images of blood vessels which have been injected with a contrast agent.

In some embodiments of the invention, the atlas also lists some connections between pairs of landmarks in the same organ or in different organs. Some of these connections, which will be referred to as path connections, indicate that there is a path between the landmarks that is entirely within the organ or organs to which the landmarks belong. There may also be non-path connections listed in the atlas which indicate some relationship between the two landmarks, for example that they belong to long narrow structures that are oriented at a certain angle to each other, or have a certain relationship between their diameters, or that they have the same image density, or one of them has an image density that is greater than the image density of the other, or that they belong to structures that are mirror images of each other around a particular plane. Such non-path connections may exist between organs that are not connected to each other by a path, for example the intercostal arteries are oriented approximately perpendicularly to the spinal channel, and the image density of the portal vein is related to the image density of the kidneys.

These listed connections are optionally used to correct the identification of voxels, first finding paths between voxels that have been identified as corresponding to landmarks that are listed in the atlas as having path connections to each other. The identified voxels and their connections to other identified voxels are stored, for example, in a graph structure, with the identified voxels as nodes of the graph, and the connections between them as edges of the graph. In the case of a path connection, if no path is found between two voxels in the graph that appears, based on the integral of a cost function, to go entirely through the organ or organs that the voxels have been identified as belonging to, then the connection between those voxels may be deleted from the graph. Similarly, a non-path connection may be deleted from the graph if the two voxels do not appear to have the expected relationship to each other. Individual voxels or connected groups of voxels that become disconnected from the rest of the graph as a result of the deletion may then also be deleted, or they may be reconnected to the graph through other voxels if good paths are found, or if an expected relationship is found to the other voxels. Optionally, the identified voxels are used as starting points for segmenting the organ they belong to, after this correction procedure has been completed.

Optionally, a graph of landmarks and connections between them, listed in the atlas, is in the form of a tree, which is a graph in which the number of points (landmarks) is one more than the number of edges (connections). Optionally, the tree is a directed tree, in which each connection has a direction, going from a "parent" landmark to a "child" landmark. Optionally, the graph is a directed acyclic graph, even if it is not a tree. Having a graph that is a tree, a directed tree, or a directed acyclic graph, may make it easier to correct the identification of misidentified voxels, as will be explained below in the description of FIG. 4A and FIG. 5, but such corrections can be done even if the graph does not fall into these categories. Optionally, each landmark has only one "parent" but may have more than one "child." As used herein, voxels in a corresponding graph are referred to as "parent" voxels or "child" voxels, and voxels with no "child" voxels are referred to as "leaf" voxels of the tree. Optionally, a procedure used for correcting the identification of voxels depends on the direction of connections. Optionally, one or more paths are found, or at least sought, extending from leaf voxels toward a boundary of the medical image, passing entirely through the organ that the leaf voxel belongs to, or through an organ connected to it. Alternatively, this is done using a different definition of leaf voxels, in which they are defined as any voxel that has only one connection, and that definition may be used even if the connections do not have directions, and even if the graph is not a tree.

In some embodiments of the invention, additional organs are segmented, that are connected to the original organs that the identified voxels belong to. Optionally this is done only after the original organs have been segmented, for example using as starting points voxels chosen from the original organs, based on their proximity to a point where the additional organs connect to the original organs. Optionally, still other organs are segmented, that are adjacent to the original organs, or to organs that are connected to the original organs, for example using their proximity to one of those organs in order to find voxels that can serve as starting points for segmenting them. Optionally, the graph of identified voxels is used to verify a segmentation that has been done separately, for example a segmentation that has been done manually, or by different software.

Before explaining at least one embodiment of the invention in detail, it is to be understood that the invention is not necessarily limited in its application to the details set forth in the following description. The invention is capable of other embodiments or of being practiced or carried out in various ways.

Referring now to the drawings, FIG. 1 shows a flow chart 100 for a procedure for segmenting soft tissue organs, according to an exemplary embodiment of the invention. The overall procedure will be described briefly first, and further details of some of the process will be shown later in more detail in other drawings.

Flowchart 100 uses as input a medical image 102, typically a three-dimensional image of all or part of a body, and a bone atlas 104. Optionally, bone atlas 104 is chosen to match or approximate one or more characteristics of the person who was imaged in image 102, for example gender, age, height, weight, or body type.

At 106, the bone atlas is registered to the medical image. This may done using any method known in the art for registering a medical image to an atlas. For example, the method described in U.S. patent application Ser. No. 12/624, 505, "Method and System for Registering a Medical Image," filed Nov. 24, 2009, assigned to Algotec, Ltd., may be used.

At 108, soft tissue voxels are identified as belonging to one or more organs. This is done, for example, by identifying the voxels as corresponding to landmarks of the organs listed in the atlas, based on their proximity to the bones, which can be identified in the image once it has been registered with the bone atlas. Optionally, other properties of the organs are also used to help identify the voxels, for example an image density that the organ is expected to have, or one or more dimensions of the organ, or a shape of the organ, or the orientation of the organ as determined by its principal axes.

Optionally, connections between landmarks are also listed in the atlas, for landmarks that belong to the same organ, or to two different organs that are related. Such connections in the atlas can be path connections, which mean that there is typically a path connecting the two landmarks, that passes entirely through the organ or organs that the landmarks belong to. The connections can also be non-path connections, which mean that there is relationship between properties of the two connected landmarks, for example a relationship between their image densities, or between the spatial orientations of local structures that they belong to. A given connection may be a path connection, a non-path connection, or both.

Once voxels have been identified as corresponding to landmarks of an organ or a set of related organs, a graph data structure 110 is optionally created for that organ or set of organs, including the voxels, and the connections that are expected to exist between them, according to connections between the corresponding landmarks listed in the atlas. Optionally the connections have a direction, and optionally the graph is in the form of a tree.

At 112, connections in the graph are optionally corrected. This is done, for example, by finding paths between voxels that correspond to landmarks that have path connections to each other in the atlas, and seeing whether there is such a path that passes only through the organ or organs that the voxels belong to. If it appears that no such path exists, then the corresponding connection may be deleted from the graph, and disconnected voxels may be deleted from the graph, or reconnected to the graph through other voxels. In the case of non-path connections, a connection may be deleted from the graph if the voxels do not have an expected relation to each other, for example an expected in relation in their image densities, or an expected relation in the orientations of structures that they are associated with.

At 114, the corrected graph is optionally expanded to the boundaries of the image. This is done, for example, by finding paths from one or more voxels that are "leaves" of the tree, corresponding to extremity nodes of the graph, which extend the path in the same general direction that it was going, passing entirely through the organ that the voxels belong to, or through organs connected to that organ directly or indirectly. For example, if there are landmarks spaced every few centimeters along the aorta and the iliac arteries, as in the example shown below in FIG. 9, then the last landmark on each of these arteries may happen to be a few centimeters from the upper or lower boundary of the image, and at 114, the graph for aorta and iliac arteries may be expanded all the way to the upper and lower boundaries of the image. In general, the graph may be expanded by 1, 2, 5, or 10 centimeters, or by larger, smaller, or intermediate distances, depending for example on the location and spacing of the landmarks, and of the organs, in relation to the image boundaries. In some cases the extended path may not reach a boundary.

At 116, a segmentation algorithm is optionally used to segment the organ or organs that the voxels in the graph belong to. A fast marching algorithm such as described below in the description of FIG. 7, or any segmentation algorithm known in the art, may be used, with the voxels in the graph optionally used as starting points, sometimes referred to as seeds, for segmenting the organ or organs.

At 118, one or more other organs connected to those original organs are also optionally segmented, even if no voxels have been identified as belonging to those other organs, because, for example, they are not close to any bones. This can be done, for example, after segmenting the original organs, using a voxel or set of voxels of an original organ as one or more seed voxels, located near where the original organ is connected to the other organ, and expanding from the one or more seed voxels. For example, specific arteries in the abdomen, that are not located close to bones, may be segmented by starting with seeds at appropriate locations in the aorta, near where the arteries being segmented join the aorta.

Organs may also be segmented that are not connected to the original organ or organs that were segmented, but are adjacent to one of the original organs, or to an organ connected to it that has also been segmented. This is done, for example, using the proximity, or known spatial relationship, of the additional organ to one of the original organs, or to an organ connected to one of the original organs, similarly to the way that the original organs were segmented based on their proximity to identified bones. For example, if the liver was segmented first, based on its proximity to certain ribs, then other organs that are not close to any bones, such as the stomach, intestines, or pancreas, can be segmented based on their proximity to the liver, or their known distance and direction from the liver.

At 120, the segmentation results are optionally outputted.

Figure 2:
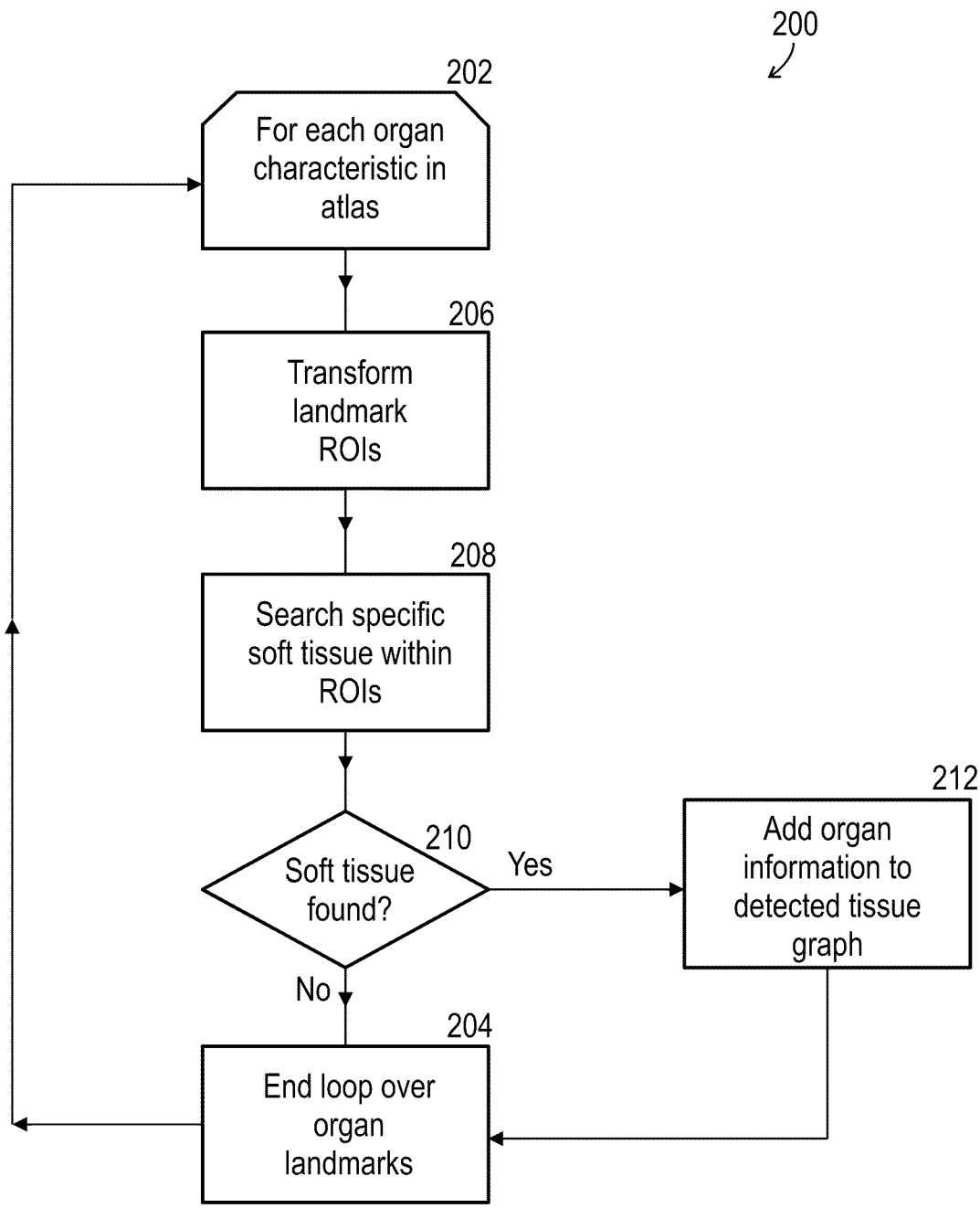
FIG. 2 is a flow chart showing more details of soft tissue identification shown in the flow chart of FIG. 1, according to an exemplary embodiment of the invention.
Figure 3:
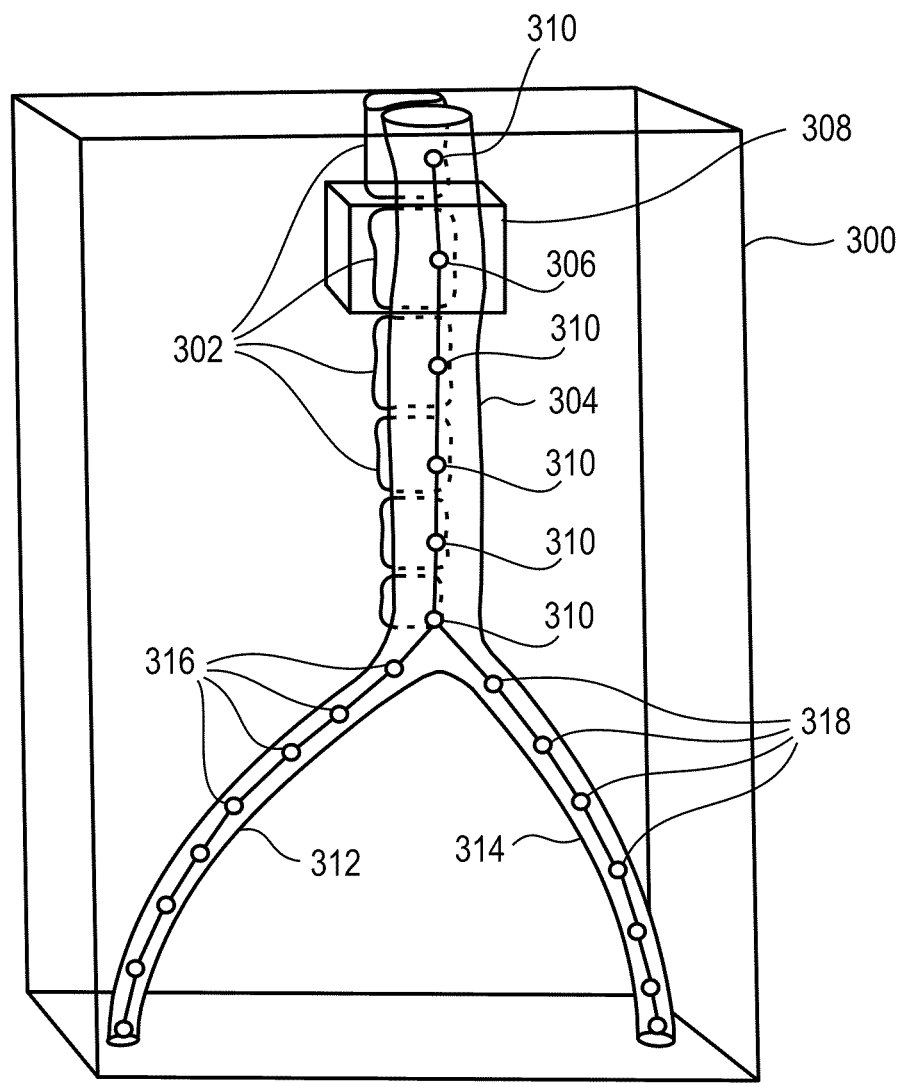
FIG. 3 is a schematic view of an exemplary medical image, to illustrate the method of FIG. 2.

FIG. 2 shows a flow chart 200, providing further details on how soft tissue voxels are identified at 108 in FIG. 1. Flow chart 200 will be described with reference to medical image 300 in FIG. 3. A loop is performed, starting at 202 and ending at 204, over a plurality of soft tissue landmarks for one or more organs, listed in bone atlas 104. The organs are optionally chosen because they have landmarks close to bones, and their proximity or known spatial relationship to those bones may be used to help identify the corresponding voxels in the image. For example, the bones may be vertebrae 302, and the organs may comprise an aorta 304, and the loop over landmarks may start with a landmark located at 306, a location that is well defined with respect to features of at least one of the vertebrae. At 206, a region of interest (ROI) around one of the landmarks is optionally transformed from the coordinates used in the atlas to coordinates of the image, using, for example, the same transforms used at 106 in FIG. 1 to register the image to the bone atlas. The transformed ROI around the landmark at 306 is labeled 308 in image 300. Although ROI 308 is shown as three-dimensional, a two-dimensional ROI may also be used. For example, the ROI may be confined to a plane that passes through the transformed location of the landmark in the image. Optionally, if the organ is a blood vessel, the plane of the ROI is perpendicular to an expected direction of orientation of the blood vessel.

At 208, a search is optionally made for a voxel in the image corresponding to the soft tissue landmark currently being examined in the loop, voxel 306 in this case. Optionally, one or more voxels in the ROI are chosen for examination, and given a score, with a higher score given to a voxel that is more likely to correspond to the landmark. If more than one voxel is examined, the one with the highest score may be accepted as the voxel corresponding to the landmark. If all examined voxels have a score below a specified minimum, then optionally no voxel is accepted for this landmark. One or more expected properties of the organ and landmark are taken into account, in calculating the score.

For example, the position of the voxel may be expected to be close to the position that the landmark would have, in the transformed ROI. An estimate is optionally obtained of an uncertainty in the position of the landmark, taking into account an average variation in shape and location of the organ among different people, optionally only among different people who have the same gender and/or similar age, height, weight and/or body type as the subject of the image. This information on variation in that landmark, or that organ, is optionally included in the atlas, based on studies of a large number of different subjects. Knowing the variation in position of the landmark, an uncertainty in the position of the corresponding voxel, and optionally a probability distribution of the position of the voxel, may be found in the transformed ROI, and this may be used to assess the likelihood that the corresponding voxel is at a given location, given other information about the organ.

Other properties of the organ, one or more of which may be taken into account in addition to or instead of the position of the landmark, include the expected image density or range of likely densities of the tissue at the location of the landmark, and properties of the dimensions, scale length, orientation, symmetry, shape or topology of the organ, including hollowness in the case of airways for example, and relations of the properties to properties of other organs that have already been segmented. As an example of how the shape of an organ may be taken into account, if the organ of the landmark is a blood vessel, then the "vesselness" of the voxels may be evaluated, and voxels with a high "vesselness" may be considered as more likely to correspond to the landmark. "Vesselness" is a property of voxels in an image that is highest for voxels that are part of a long narrow region of uniform density, and it is optionally based on the ordered eigenvalues of a Hessian matrix of the image density. Examples of how "vesselness" may be defined and calculated are given, for example, by Alejandro F. Franji, Wiro J. Niessen, Koen L. Vincken, and Max A. Viergever, "Multiscale vessel enhancement filtering," *Lecture Notes in Computer Science* 1496, 130 (1998), in published patent application WO2006/097911, "Bone Segmentation," and in U.S. patent application Ser. No. 12/624,519, "A Method and System for Segmenting Medical Imaging Data According to a Skeletal Atlas," filed Nov. 24, 2009, both applications assigned to Algotec, Ltd. The eigenvectors of a Hessian matrix may also be used to find the orientation of the organ, and its scale length in different directions.

An alternative way to find the orientation, shape and dimensions of an organ which a voxel belongs to, is to use principal component analysis of the set of voxels that are connected to the voxel being analyzed, by a path that goes only through voxels that have image density above a threshold. If the threshold is chosen appropriately, for example 150 Hounsfield units, then voxels of a blood vessel that the voxel belongs to will generally be included in the principal component analysis, but voxels of other nearby blood vessels or bones, separated from that blood vessel by a small gap, may tend not to be included. The inventors have found that this method often produces more accurate results when segmenting blood vessels than finding the eigenvectors and eigenvalues of a Hessian matrix using spatially filtered image data, which may be confused by other nearby blood vessels and bones.

Once the diameter and orientation of a blood vessel or other organ that a voxel belongs to have been found, this information may be used in judging how likely it is that the voxel corresponds to a landmark of a given blood vessel. For example, the aorta may be expected to be oriented along the length of the body, and to fall within a particular range of diameters, while the renal arteries may be expected to be oriented along the left-right axis of the body, and to fall within a different range of diameters. Blood vessels are optionally distinguished from bones and other long narrow structures if blood vessels are expected to have a very uniform image density internally, and/or if this uniform density is expected to fall within a certain range, depending on whether or not contrast agents are used.

The eigenvalues of the Hessian matrix, or principal component analysis, may also be used to evaluate whether the voxel is part of a differently shaped region of higher image density, for example a region with a plate-like shape, or a sphere-like shape, which might indicate that the voxel is part of an organ with one of those shapes, or is in a region with irregularly varying image density which might indicate that the image density at the voxel is dominated by noise, which cannot be reliably used to identify the voxel.

Once one or more voxels of one organ have been identified, or the organ has been completely segmented, then properties of that organ may be used to find expected properties of another organ, which may be used to evaluate the likelihood that a given voxel belongs to the other organ. For example, in the absence of contrast agents in the blood, the density of all blood vessels may be expected to be about the same. If a contrast agent is used, introduced into the circulatory system through a vein, then the density of a more peripheral artery, such as a tibial artery, may be expected to be no greater than the density of more central artery that the blood has to pass through first, such as the femoral artery of the same leg. The more peripheral arteries may also be expected to be smaller in diameter than the more central arteries feeding into them. A symmetry relation between paired organs that is listed in the atlas, such as the symmetry between the two kidneys, or between the intercostal arteries circling the vertebrae on each side, may also be used to identify voxels of the other organ of a pair, once a first one of the organs has been segmented, or some of its voxels have been identified.

The following method has been found by the inventors to be useful for finding the score of a voxel, when the landmark is in the aorta. A two-dimensional ROI is optionally used, optionally consisting of a 60 mm by 60 mm square, in the plane perpendicular to the long axis of the body (approximately the axis of the aorta), centered on the transformed location of the landmark, which is in the center of the aorta in the atlas. One aorta landmark is optionally used for each vertebra within the image. All of the connected regions of voxels in the ROI, with image density greater than 150 Hounsfield units, for example, are found. A score is assigned to one voxel chosen in each connected region, for example at the center of mass of the connected region, or at a point in the connected region closest to the center of mass. The chosen voxel need not be within the connected region, though it usually is if it is at the center of mass. A 2-D principal component analysis (PCA) is optionally performed for each connected region, and the connected region is only considered as a viable candidate if the ratio of maximum to minimum axis is less than 1.5, for example, and if the area of the connected region is greater than 0.5 times the area of an ellipse with that maximum and minimum axis, for example. If there is only one connected region that meets these requirements, then the voxel chosen for that region is the voxel identified with the landmark. If more than one connected region meets these requirements, then each one is optionally assigned a score consisting of the sum of two terms. The first term optionally climbs linearly from 0 if the ratio of maximum to minimum axis is 1.5, up to 1 if the ratio of maximum to minimum axis is 1. The second term optionally climbs linearly from 0 if the ratio of the area of the connected region to the area of the ellipse is 0.5, up to 1 if the ratio of the area of the connected region to the area of the ellipse is 1. A third term of the score is also optionally added, depending on how far the chosen voxel of the connected region is from the transformed location of the landmark. For the connected region that is closest, this component is optionally $\frac{2}{3}$ and for the connected region that is furthest, this term is optionally 0, while evenly spaced values between $\frac{2}{3}$ and 0 are optionally used for any other connected regions according to the rank of their distance. The chosen voxel in the connected region with the highest score is optionally identified with the landmark.

If no connected region meets the requirements, then the chosen voxel for each connected region is optionally evaluated by a different procedure, described in published patent application WO2006/097911, "Bone Segmentation," assigned to Algotec, Ltd., in a section headed "Distinguishing blood vessel seeds from bone seeds." If the connected region is deemed likely to be part of a blood vessel by the criteria outlined there, it is optionally assigned a score ranging from 0 to 1 with higher scores going to connected regions deemed most likely to be parts of blood vessels. If no connected region is deemed likely to be part of a blood vessel by those criteria, then optionally no voxel is identified with this landmark. If more than one connected region is deemed likely to be part of a blood vessel, then the chosen voxel in the connected region with the highest score is optionally identified with the landmark. Optionally, the score also includes the term depending on the distance of the connected region from the transformed location of the landmark, as described above.

A different method has been found useful by the inventors for finding the score of a voxel, when the landmark is in a smaller but still major artery that is close to a bone, such as one of the iliac, femoral, or tibial arteries. The ROI for each landmark is optionally two-dimensional, a 40 mm by 40 mm square in the case of the iliac arteries, or a 30 mm by 30 mm square in the case of the femoral and tibial arteries, in a plane perpendicular to the long axis of the body, passing through and centered on the transformed location of the landmark. Connected regions of voxels with image density greater than 150 Hounsfield units are optionally found in the ROI, and a voxel is chosen for each one, as described above. Each chosen voxel is then optionally used as a seed for expanding the connected region in three dimensions, using a fast marching algorithm for example, out to a maximum distance in each direction, above and below the plane of the ROI, equal to three times the expected diameter of the artery being considered, for example. If the connected region is indeed part of that artery, then the expanded connected region would extend in the direction perpendicular to the plane of the ROI about 6 times its diameter in the plane of the ROI. A 3-D principal components analysis is done on the expanded region, and it is optionally accepted as a viable candidate if its longest axis is at least 5 times as great as its shortest axis, and if the direction of its longest axis is within 30 degrees of the direction of the axis of that artery listed in the atlas at the location of that landmark. If more than one connected region meets these criteria, then scores are optionally assigned that are higher if the ratio of the longest to shortest axis is greater, and if the direction of the longest axis is closer to the expected direction of the axis of the artery, with each of these two considerations contributing a term to the score that can range from 0 to 1, for example. An additional term is optionally added to the score, depending on the distance of the seed voxel from the transformed location of the landmark, as described above.

Optionally, the methods described above for assigning scores to voxels for the aorta and other major arteries may be modified, for example by increasing or decreasing any of the numbers mentioned, independently of other numbers mentioned, by up to 10%, 20%, 30%, 50%, a factor of 2, a factor of 3, a factor of 5, or a factor of 10, or more than a factor of 10. All of the terms that are mentioned as contributing to the score need not be used, but only one or some of them may be used, and other terms may be used in the score as well. Similarly, all of the criteria mentioned for eliminating candidate voxels need not be used, and other criteria may optionally be used as well.

At 210, the procedure asks whether or not the landmark being considered has been successfully identified, at least tentatively, as corresponding to one of the voxels in the image, using one of the methods described above, for example. If it has been, then at 212, the voxel is added to a data structure in the form of a "graph," as the term is defined in topology, a set of nodes with edges connecting at least some of them. The nodes in the graph correspond to the landmarks listed in the atlas that have been tentatively identified so far, for the organ or organs being examined, for example voxels 306 and 310 in the case of aorta 304 in image 300, and the edges of the graph correspond to connections between the landmarks that are listed in the atlas, for example the edges connecting voxels 306 and 310 in image 300. If the landmark has not been identified, the graph is not updated. In either case, now the next landmark in the loop is considered, at 202, optionally until all the landmarks belonging to that organ or organs have been examined, and the loop ends at 204.

Optionally, the landmarks and connections listed in the atlas for a given organ or related set of organs comprise a tree, defined as a graph for which the number of nodes is one more than the number of edges. Such a graph may be particularly useful when the organs being examined consist of one or more connected arteries, or one or more connected veins. Optionally, the connections between the nodes of the tree, or of any graph, each have a direction, listed in the atlas or calculated in some way. For example, if the graph is a tree, then one point is optionally selected to be the root of the tree, and all connections are optionally directed to be outward from that point. If the tree represents connected arteries, or connected veins, for example, the direction of a connection may be a direction of blood flow along that segment of an artery or vein, for all connections in the tree, or a direction opposite to the direction of blood flow for all connections in the tree. However, it should be emphasized that the graph need not be a directed tree, or a tree at all.

The landmarks in the loop starting at 202 need not be limited to one organ, but may include landmarks in organs that are connected to the first organ directly or indirectly, for example landmarks 316 in right iliac artery 312, and landmarks 318 in left iliac artery 314, which are connected to aorta 304. The loop starting at 202 may also include landmarks of organs that are not connected to the first organ, but that have locations, within image 300, that can be defined in terms of bones listed in the bone atlas. Some of the landmarks may have non-path connections with landmarks in the first organ.

Figure 4A:
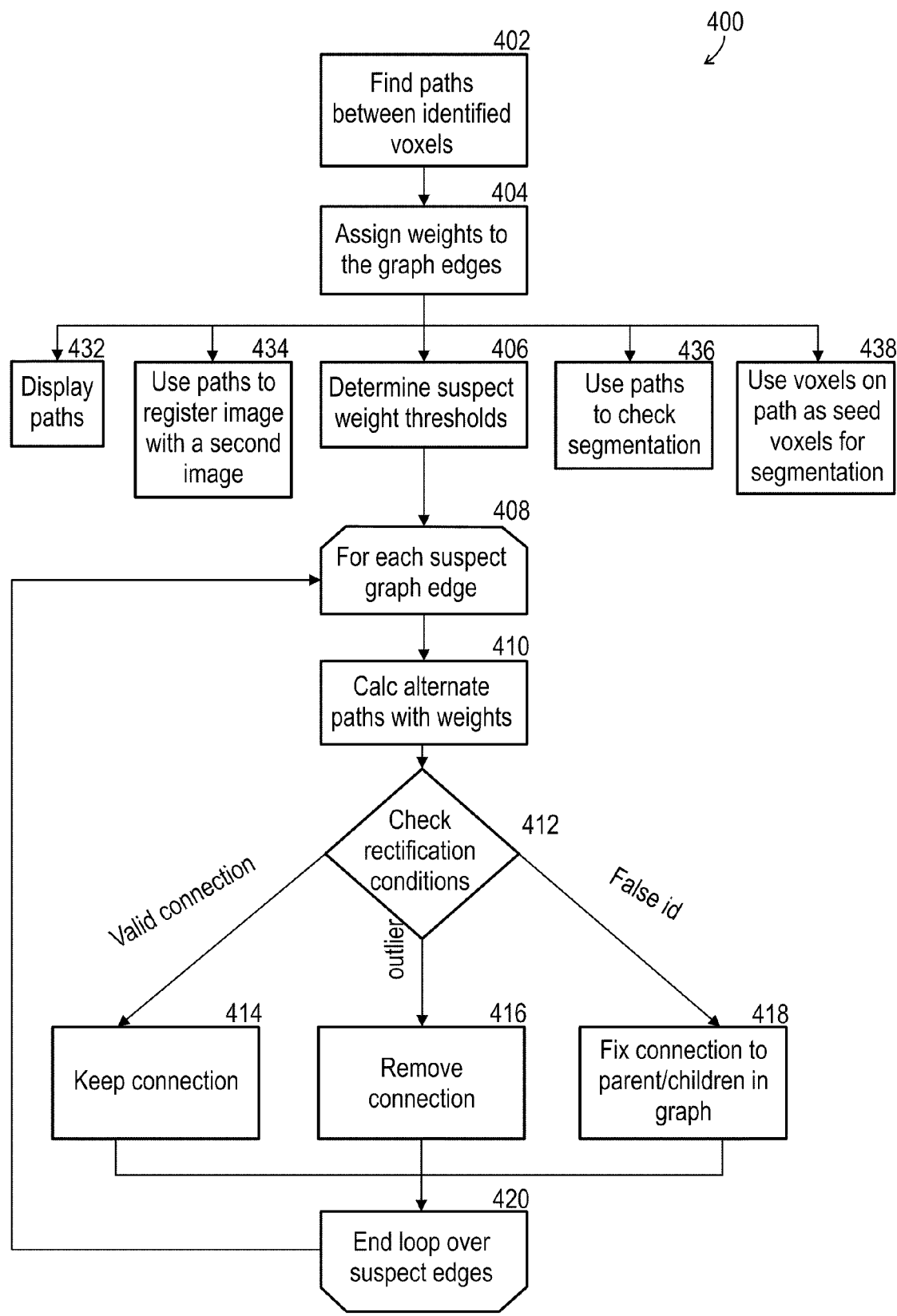
FIG. 4A is a flow chart showing more details of correcting the connections, in the flow chart of FIG. 1, for the case of path connections, according to an exemplary embodiment of the invention.
Figure 4B:
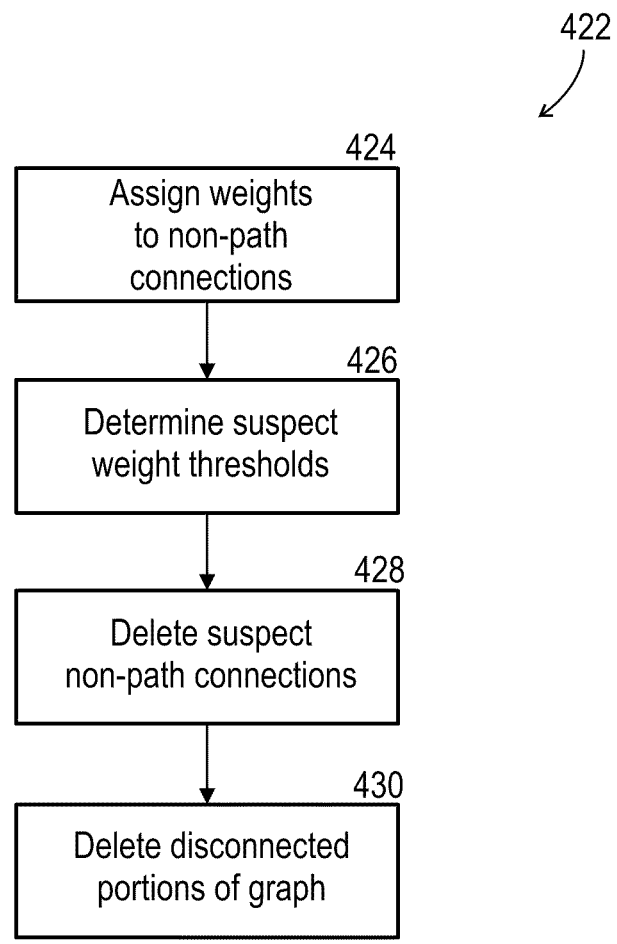
FIG. 4B is a flow chart showing more details of correcting connections, in the flow chart of FIG. 1, for the case of non-path connections, according to an exemplary embodiment of the invention.

FIG. 4A shows a flow chart 400 with more details on correcting connections in a graph, at 112 in FIG. 1, for the case of path connections. FIG. 4B, to be described below, shows such a flow chart for the case of non-path connections. The procedure of flow chart 400 is illustrated with exemplary graphs of identified voxels and connections between them, shown in FIGS. 5A through 5H.

At 402, paths are optionally found in the image between each pair of identified voxels that are connected to each other by path connections, in the graph data structure for an organ or a set of connected organs that was created at 212 in flow chart 200. The paths are optionally found according to an algorithm that gives preference to paths that go entirely through the organ or organs that the voxels belong to, so if such a path exists, the algorithm used at 402 is normally expected to find it, rather than finding another path that does not go entirely through that organ or those organs. The paths are found, for example, using a targeted fast marching algorithm, such as the algorithm described in published patent application PCT/IL2004/001168, "Targeted Marching," assigned to Algotec Systems, Ltd., or using any other algorithm known in the art that can find such paths.

At 404, weights are optionally assigned to each path connection, calculated from the paths found at 402. For example, the weight w(u,v) for a path connection between identified voxels u and v is set equal to a cost function integrated along the path between voxels u and v, optionally normalized to the length of the path. The cost function is optionally chosen so that is relatively low at locations inside the organ or organs that voxels u and v belong to, and relatively high outside those organs. A path that goes entirely through the organ or organs that voxels u and v belong to will thus have a relatively low weight w(u,v), while a path that wanders outside that organ or those organs will have a relatively high weight. Optionally, the same cost function, or a similar cost function, is used in the path-finding algorithm used at 402, to find paths which have, or have close to, minimum weight, or locally minimum weight. The cost function may depend on one or more factors that distinguish voxels inside the organ or organs, from voxels outside. For example, if the organ is expected to have a particular range of image densities, then the cost function may be high except for that range of image densities, or the cost function may be high for any density that is sufficiently below that range. The cost function may also depend on any other factor used at 208 in flow chart 200, to evaluate whether a given voxel belongs to a given organ. For example, the cost function may depend on vesselness, or on eigenvalues and/or eigenvectors of a Hessian matrix, or on the results of a principal component analysis of nearby voxels, or on any other quantity that depends on the shape, dimensions, scale length, orientation, symmetry, hollowness, or topology of an organ that a given voxel belongs to. The cost function optionally depends on properties of other organs that have already been segmented, or that have had their landmarks identified. For example, if the organ being examined in flow chart 400 is an artery, then it may be expected to have the same density as other arteries if no contrast agent is used, or a density that is no higher than the density of an artery that feeds into it, if a contrast agent is used. If the density of the other artery is known, then the value of its density can be used in calculating the cost function for this artery. Similarly, the diameter of a given artery may be expected to be less than the diameter of another artery that feeds into it, so if the diameter of the other artery can be determined, because it has already been segmented for example, that information can be used in calculating the cost function of this artery.

Elements 432, 434, 436 and 438 in FIG. 4A describe purposes to which the paths found at 402 can be put, instead of or in addition to correcting connections in the graph, without or without finding the path weights at 404, and will be described below, following the description of FIG. 6.

All of the path connections being considered in flow chart 400 are between voxels that, according to the atlas, are expected to have paths between them that go only through the organs they belong to. If any path connection has an unusually high weight, that may be an indication that at least one of the voxels it connects was incorrectly identified in flow chart 200. At 406, the weights of the different path connections are optionally examined, to determine a threshold weight, above which a path connection will be considered suspect. Typically, the weights of the good path connections may be expected to cluster at low values, and the relatively few bad path connections may have much higher weights, well separated from the other weights. By examining the distribution of weights for the different path connections found at 404, a threshold weight may be found, distinguishing the good path connections from the suspect ones. Typically, the list of suspect path connections may be expected not to depend very much at all on the exact value of the threshold, since the suspect path connections may have weights that are well separated from the weights of the good path connections. Optionally, the threshold weight is chosen so that there are expected to be no false negatives, while false positives are tolerated because the path connections may be tested later to see if they are valid.

A loop through each suspect path connection begins at 408, and ends at 420. For each suspect path connection, one or more alternate paths are optionally found at 410, each connecting one of the identified voxels of the suspect path connection to another identified voxel, which it was not already connected to by a path connection in the graph. Weights w(u,v) are optionally found for the new paths, and compared to the weights of the suspect paths at 412, as will be explained below. This procedure may reveal that 1) the identified voxels could be better connected in a different way than they were at the end of flow chart 200, or 2) that one or more identified voxels may not really belong to this organ or set of organs at all, and should be deleted from the graph. The first situation might occur, for example, if two arteries branch off from another artery, and one identified voxel has been identified as belonging to the wrong one of the two arteries. In this situation, the misidentified voxel is referred to as a "false id." The second situation might occur if a voxel located in a nearby bone has been incorrectly identified as belonging to an artery. In this situation, the misidentified voxel is referred to as an "outlier."

Optionally, if the graph is directed and acyclic, for example a directed tree, then a reverse sort is performed on the nodes of the graph, so that if there is a directed connection going from node u to node v, then node v will be listed before node u, in the reverse sorted list of nodes. Then, in the loop over the suspect path connections, connections are optionally examined in the order that their source nodes are listed in the reverse sorted list. This has the potential advantage that, when a suspect connection is being examined, the connections of all of its descendent nodes will already be finalized.

An exemplary procedure for finding alternate paths, and comparing their weights to those of existing paths, is described with reference to FIGS. 5A-5H. It should be understood that the examples shown in FIGS. 5A-5H do not necessarily cover all possible situations in which misidentified voxels are deleted or their connections are changed. In the examples shown in FIGS. 5A-5H, the graph is a tree, with directed connections, which allows the identified voxels to be ordered in a hierarchy from earlier to later generations, and this ordering is used in the procedure. However, in other embodiments of the invention, the graph may not be a tree, and/or the connections may not be directional, and a modified procedure may be used to delete or reconnect identified voxels that have suspect connections.

Figure 5A:
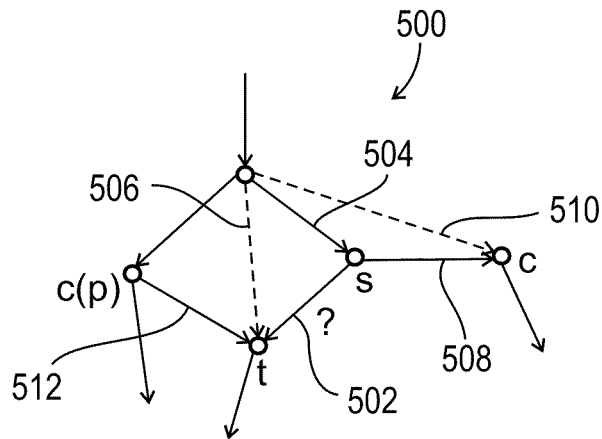
FIG. 5A is a schematic view of identified voxels and connections between them, in an exemplary medical image, to illustrate the method of FIG. 4.
Figure 5B:
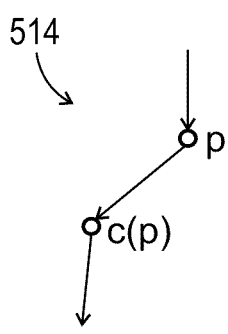
FIGS. 5B-5F are schematic views of the voxels and connections of FIG. 5A, after the connections have been rectified, to illustrate different cases described in FIG. 4.
Figure 5C:
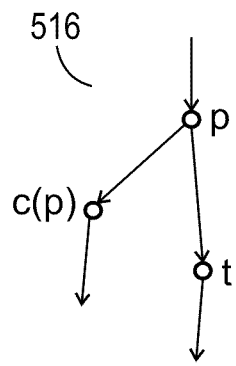
Figure 5D:
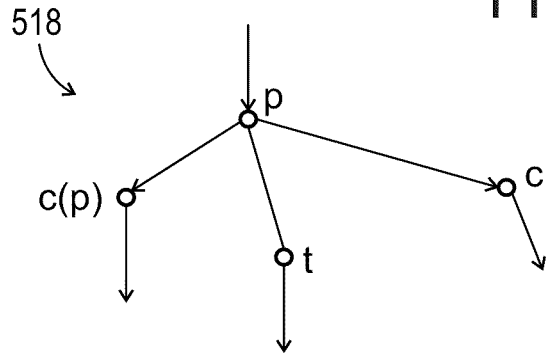
Figure 5E:
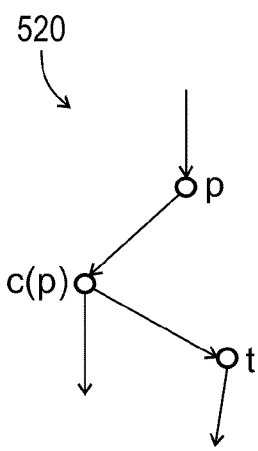
Figure 5F:
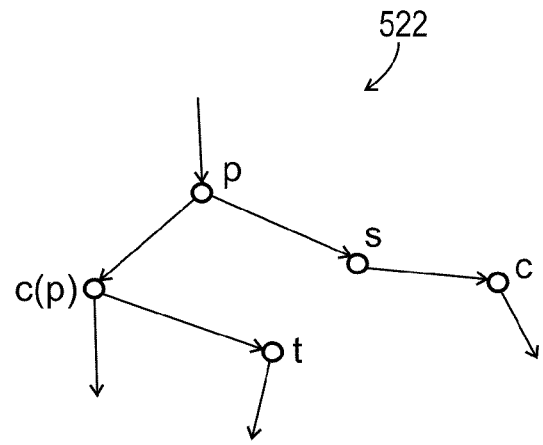

Graph 500 in FIG. 5A has an identified voxel s (for "source") connected to an identified voxel t (for "target") by a suspect connection 502. The dashed lines in FIG. 5A are not part of graph 500 initially, but are alternative connections used in evaluating graph 500, as explained below. Graph 500 also comprises a parent voxel p of voxel s, and optionally also comprises another child voxel c of voxel s, and another child voxel c(p) of voxel p. The following three tests are optionally made, to see whether voxel s or its children should be deleted from the graph or reconnected to the graph in a different way.

1) If connection 504 between p and s is also suspect, then s is considered to be an "outlier" and is deleted from the graph, together with all of its descendents. After these deletions, graph 500 would look like graph 514 in FIG. 5B. However, before deleting voxel t, an alternate path 506 is optionally found between voxel p and voxel t, and its weight w(p,t) is calculated, as described above for the existing connections. If w(p,t) is less than w(s,t), then optionally voxel t is reconnected to voxel p in the graph. After this is done, graph 500 looks like graph 516 in FIG. 5C.

2) If connection 508 between voxel s and voxel c is suspect, for all voxels c that are children of s, then, optionally even if connection 504 is not suspect, voxel s is considered to be an "outlier junction," and is deleted from the graph. Alternatively, voxel s is considered to be an outlier junction only if connection 504 is suspect. Alternate paths are optionally found between p and each of the children of s, exemplified by voxels t and c in FIG. 5A. If the alternative path has a lower weight than the path from s to that child, then that child is connected directly to p in the graph. For example, if the weight for path 506 between p and t is lower than the weight for path 502 between s and t, then p is connected to t in the graph, and if the weight for path 510 between p and c is lower than the weight for path 508 between s and c, then p is connected to c in the graph. The resulting graph, if p is connected to both t and c, looks like graph 518 in FIG. 5D. Optionally, this procedure is also done for c and any other children of s if s is an outlier as described in the previous paragraph, even if the connection between s and its other children is not suspect.

3) Alternative paths are found between t and each of the other voxels c(p) that are children of p. If w(c(p),t) is less than w(s,t) for any c(p), then voxel s is considered to be a "false id," and that c(p), rather than voxel s, is connected to voxel t. If voxel s has no other children, then optionally voxel s is deleted from the graph. After these changes, graph 500 will look like graph 520 in FIG. 5E. If voxel s has another child c, then voxel s and its other children are optionally kept, and after these changes graph 500 will look like graph 522 in FIG. 5F. Optionally, voxel s is kept even if it has no other children c.

Figure 5G:
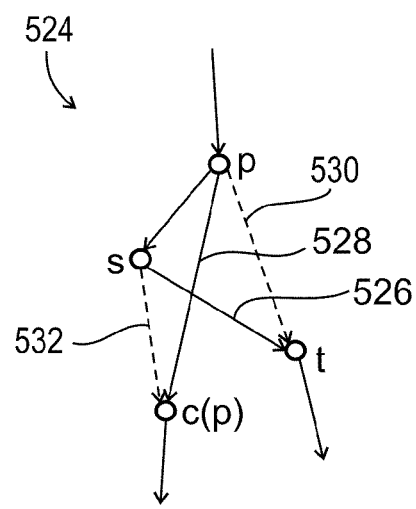
FIG. 5G is a schematic view of identified voxels and connections between them, in another exemplary medical image, to illustrate the method of FIG. 4.
Figure 5H:
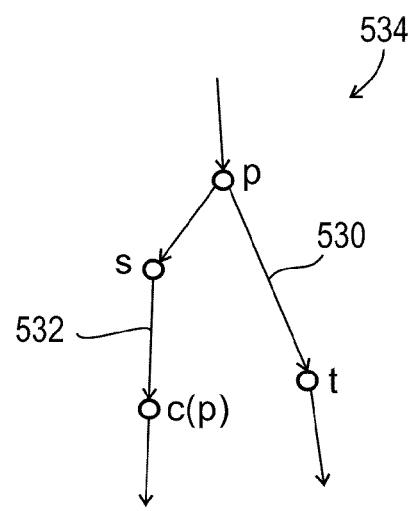
FIG. 5H is a schematic view of voxels and connections of FIG. 5G, after the connections have been rectified, to illustrate the method of FIG. 4.

Other situations of misidentified voxels are also possible. For example, FIG. 5G shows a graph 524, in which both a connection 526 between voxels s and t, and a connection 528 between voxels p and c(p), are suspect. An alternative path 530 between p and t, and an alternative path 532 between s and c(p), are optionally found, and weights are found for those potential connections. If potential connection 530 has a lower weight than connection 526, then connection 526 is replaced by connection 530. If potential connection 532 has a lower weight than connection 528, then connection 528 is replaced by connection 532. The resulting graph, if both connections are replaced, looks like graph 534 in FIG. 5H, with all of the original identified voxels still present, but connected in a different way. Graph 524 may be considered a case of "false id," where, for example, there are two arteries branching off a larger artery, and voxel s was identified as belonging to the wrong branch artery.

Optionally, if voxel s is not found to be an outlier, an outlier junction, or a false id, then the graph is unchanged, and voxel s, and its connection to voxel t, are kept in the graph, in spite of the connection between s and t being suspect. The tests described above may be done in any order, and some or all of them may be done in parallel. If the tests are not done in parallel, then optionally if the connection between voxel s and voxel t is deleted from the graph because it has failed one of the tests, then the later tests are not performed.

Referring back to FIG. 4A, the suspect path connection is kept, at 414, if voxel is not found to be an outlier, an outlier junction, or a false id. The suspect path connection is removed, together with voxel s, at 416, if voxel s is found to be an outlier or an outlier junction, and the suspect path connection is removed, with voxel t reconnected to a different voxel, at 418, if voxel s is found to be a false id.

FIG. 4B shows a flow chart 422, with details on correcting connections in a graph, at 112 in FIG. 1, for the case of non-path connections. At 424, weights are optionally assigned to the non-path connections in a graph for one of the organs or sets of organs. The weights depend on the extent to which the voxels that were identified as corresponding to the connected landmarks have properties that satisfy the relation between the landmarks that the non-path connections asserts. For example, if the connection between the landmarks asserts that the landmarks have the same image density, then the weight assigned to the connection is low if the two voxels have image densities that are close to each other, and high if the two voxels have very different image densities. At 426, a threshold weight is optionally determined for a connection to be suspect. Optionally, this is done in a way similar to the determination of a threshold weight for suspect path connections at 406 in FIG. 4A. At 428, graph edges corresponding to suspect connections are optionally deleted from the graph structure. At 430, identified voxels that have become disconnected from the rest of the graph, as a result of the deletion of the suspect connections, are also optionally deleted from the graph. Alternatively, an attempt is optionally made to find other voxels to which those voxels can be connected by new non-path connections, analogous to the procedure used when path connections are deleted, in flow chart 400 in FIG. 4A. In some embodiments of the invention, identified voxels that have become disconnected from the rest of the graph are not deleted at 430 if they satisfy certain conditions. For example, an identified voxel is not deleted if it can be used alone as input for a segmentation algorithm as described below at 704 of flow chart 700 in FIG. 7. Additionally or alternatively, an identified voxel is not deleted if it was given a high score, compared to other voxels or above a specified threshold, at 208 of flow chart 200 in FIG. 2, or if it satisfies both these conditions.

Figure 6:
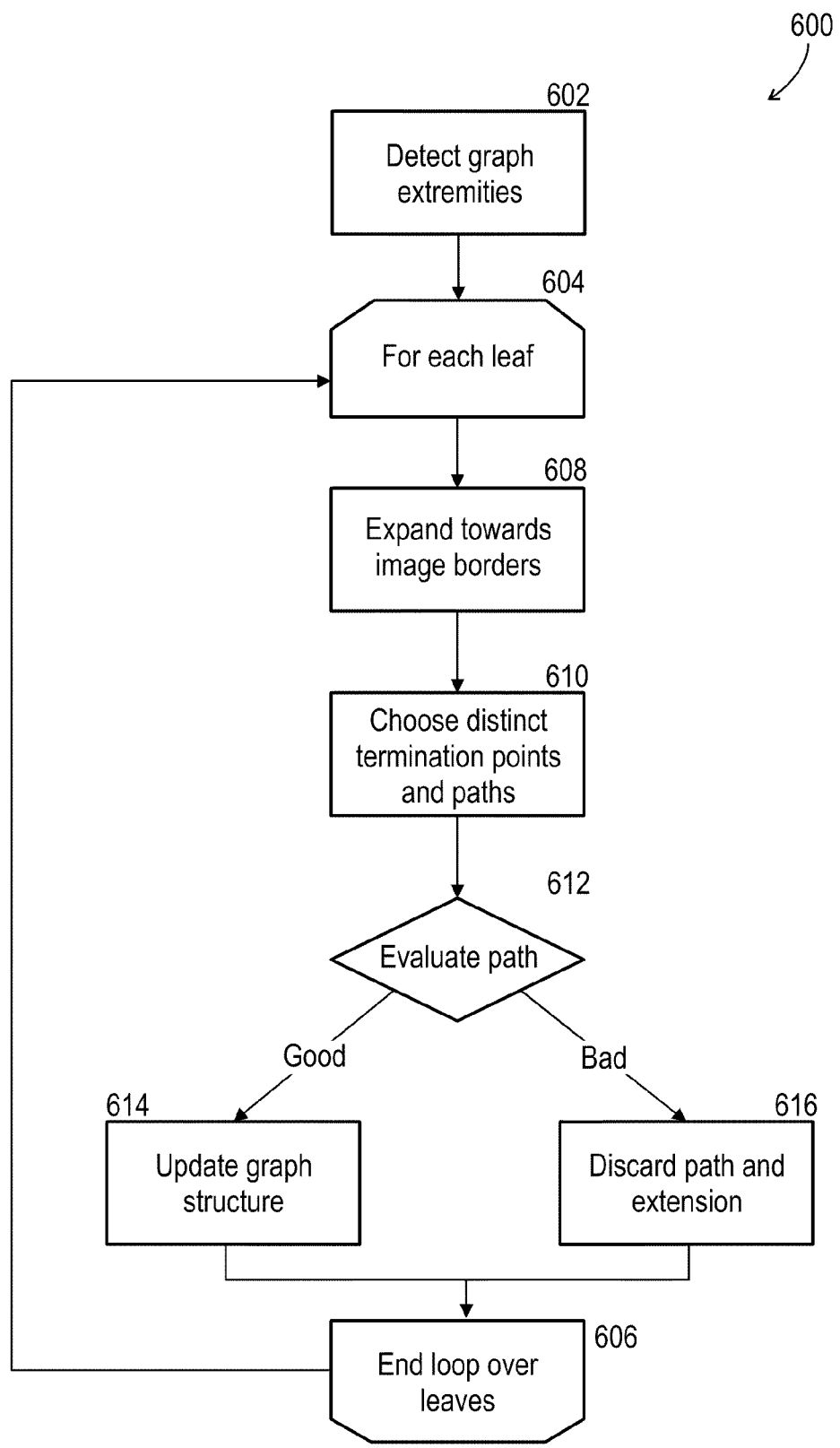
FIG. 6 is a flow chart showing more details of expanding the graph to the image borders, in the flow chart of FIG. 1, according to an exemplary embodiment of the invention.

FIG. 6 shows a flow chart 600, with further details of how a graph is expanded toward the boundaries of the image at 114. At 602, identified voxels in the graph are optionally examined to see if they are "leaves," or extremities of the graph. A voxel may be defined as a leaf if it has only one connection, or, in the case of a graph that is a directed tree, if it has no children. Alternatively, in the case of a directed graph, whether it is a tree or not, a voxel may be defined as an extremity node if it has either no children or no parent. A loop over the leaves or the extremity nodes begins at 604 and ends at 606. The loop may be run through sequentially or in parallel. In any of the procedures described below, extremity nodes may be used instead of leaves.

At 608, the organ to which the leaf voxel belongs is expanded outward, away from the path connecting the leaf voxel to the other identified voxels. The expansion is done, for example, using a fast marching algorithm, using the leaf voxel as a seed. Alternatively, any other kind of region growing algorithm, known in the art of image segmentation, is used. Fast marching algorithms are described, for example, by J. A. Sethian, "Fast marching method," SIAM Review 41, 199-235 (1999). In a fast marching algorithm, expansion proceeds at a speed that is faster in regions which appear to be part of the organ, based on image density and other properties, including any of the properties used in the cost function described above for finding paths at 402 of flow chart 400, or used for identifying voxels at 208 of flow chart 200. Optionally, the expansion speed is a monotonically decreasing function of a cost function as described above, for example the inverse of such a cost function. Expansion is at a slower speed, or zero speed, in regions that appear less likely or unlikely to be part of the organ.

The fast marching algorithm, or other expansion algorithm, is optionally set to preferentially expand in a direction outward from the leaf voxel, away from the other identified voxel or voxels in the graph that the leaf voxel is connected to, rather than expanding back toward the other identified voxels. A preferred direction for expansion is found, for example, by finding a voxel on the path a certain distance back along the path from the leaf voxel, for example 1, 2, or 4 cm back along the path from the leaf voxel, and finding the direction of a vector pointing from that voxel to the leaf voxel. This direction is referred to herein as the average direction of the last part of the path before the leaf voxel. Optionally, the expansion algorithm is set so that expansion in this general direction is preferred to expansion in the opposite general direction, back in the direction the path came from. For example, expansion is limited to a range of directions that includes this direction, but does not include the opposite direction.

Expansion optionally stops when the boundary of the image is reached. During expansion, the values of two quantities are optionally stored for each voxel that is found: 1) an integral over a local cost function along a path followed from the seed to the current voxel, and 2) the distance of the current voxel from the seed, along the path followed, which will be referred to as the geodesic distance.

Optionally, at 610, one path of the expansion from the seed voxel is selected, and the other paths from that seed voxel are discarded. Optionally, the selected path is chosen by first calculating the persistency of the local minima of the negative of the geodesic distance, for each voxel that was found by the expansion. Voxels are then optionally eliminated for which the persistency does not exceed a particular minimum value, for example 10 mm. Persistency is defined by S. Beucher, "The watershed transform applied to image segmentation," *Scanning Microscopy International, suppl.* 6, 1992, pp. 299-314, as well as by A. Szymczak, A. Tannenbaum, and K. Mischaikow, "Coronary vessel cores from 3D imagery: a topological approach." The persistency of the local minima of the negative of the geodesic distance, in the case of expansion into a set of branching arteries, may be approximately the distance to the point where the artery runs into a larger artery, so this procedure may eliminate voxels that belong to small side branch arteries, shorter than 10 mm. The value of 10 mm in this example was chosen so that only a few artery branches may remain, for example only three branches. For each of these remaining branches, a voxel is optionally chosen at the end of that branch, for example at the center of mass of a small connected region around the voxel with greatest geodesic distance, and is followed back to the seed voxel, along the gradient of the geodesic distance, to find a path from the seed along that branch. The integral of the cost function is then found for the path along each branch. Optionally, only the path with the lowest integral of the cost function is kept.

At 612, the selected path is optionally evaluated. If the integral of the cost function along the path, optionally normalized by the length of the path, is below a chosen threshold value, then the path is optionally considered to be good, going entirely through the organ to which the seed belongs, or through one or more organs connected directly or indirectly to that organ. If the integral of the cost function along the path is too high, then it is likely that the path is not good, and it is optionally discarded. If the path is accepted as good, then its end voxel is added to the graph, with a connection to the seed voxel.

Optionally, during the procedure of flow chart 600, the local cost function, which potentially must be evaluated at all the voxels over a large volume of the image, is defined in a relatively simple way that is quick to calculate and may depend only on local quantities, for example it may depend only on the local image density. Once a single path extending outward from the seed voxel has been found, a more complicated cost function is optionally defined, and used for evaluating the integral of the cost function along the path, and for segmenting the organ, for example using the procedure described below for 808 in FIG. 8. The new cost function may depend, for example, on properties of the path, such as its orientation or curvature, which may have been difficult to calculate or even define sensibly before the path was found. Using such properties of the path may be more useful than using local quantities alone, for distinguishing different organs.

Referring again to FIG. 4A, in some embodiments of the invention, the paths found at 402, with or without the weights found at 404, and with or without the path extensions found by the method of flowchart 600 in FIG. 6, are used for one or more purposes other than correcting the graph, at 432, 434, 436, and 438, instead of or in addition to being used for correcting the graph in the loop from 408 to 420. For example, at 432, the paths found may be displayed for a user, either non-interactively, or on an interactive user interface, such as the user interface described in provisional U.S. patent application 61/264,676, "User Interface for Selecting Paths in an Image."

At 434, a set of connecting paths is found for a second image, registered to the same bone atlas and using at least some of the same landmarks as in the first image, and a comparison of the paths in the two images is used to register the second image to the first image, possibly including registration of soft tissue organs which are not included in the bone atlas, but which the paths traverse. In some embodiments of the invention, registration of the second image to the first image is accomplished by comparing only the corresponding landmark voxels in the two images, and in these embodiments the connecting paths need not be found at all. The two images may represent two different patients, or the same patient at two different times, and the registration of the two images may be used to compare a medical condition in two patients, or to examine the progression of a medical condition in one patient.

At 436, the paths found are used for checking a segmentation of the image, including a segmentation done according to the method described below in connection with FIG. 7, or using any other method of segmentation. If the bone atlas lists a path connection between two landmarks going entirely through a particular organ which is segmented in the image, and a path found between voxels identified with those landmarks is not located entirely within the segmentation of that organ, then this may indicate a possible error in the segmentation, as well as a possible error in the identification of the landmarks. If the weight of the path is calculated as described at 404, and is found to be sufficiently low, this may indicate that the error is likely to be in the segmentation rather in the landmark identification.

At 438, the paths found are used to supply seeds for segmenting organs that the paths are supposed to pass through. For example, in addition to or instead of using one of the landmark voxels that the path connects as a seed for growing the organ, one or more voxels in the middle of the path, for example voxels regularly spaced along the path, may be used as seeds for growing the organ. Optionally voxels are chosen as seeds only if they are on relatively low weight paths, and/or only if the voxels have relatively low cost, below a chosen threshold, to ensure that the voxels are part of that organ, with a desired degree of confidence. Such a procedure may speed up the segmentation, especially if done with a computer that uses parallel processing, growing the organ in parallel from several different seeds. As used herein, such a method of segmentation is still considered as using the landmark voxels that the path connects as starting points, since those landmark voxels were used to find the path.

If the paths found are used for any of these purposes, then optionally the path weights are not calculated at all at 404, if they are not needed, and/or the graph is not corrected at all, at 406 and the loop from 408 to 420.

Figure 7:
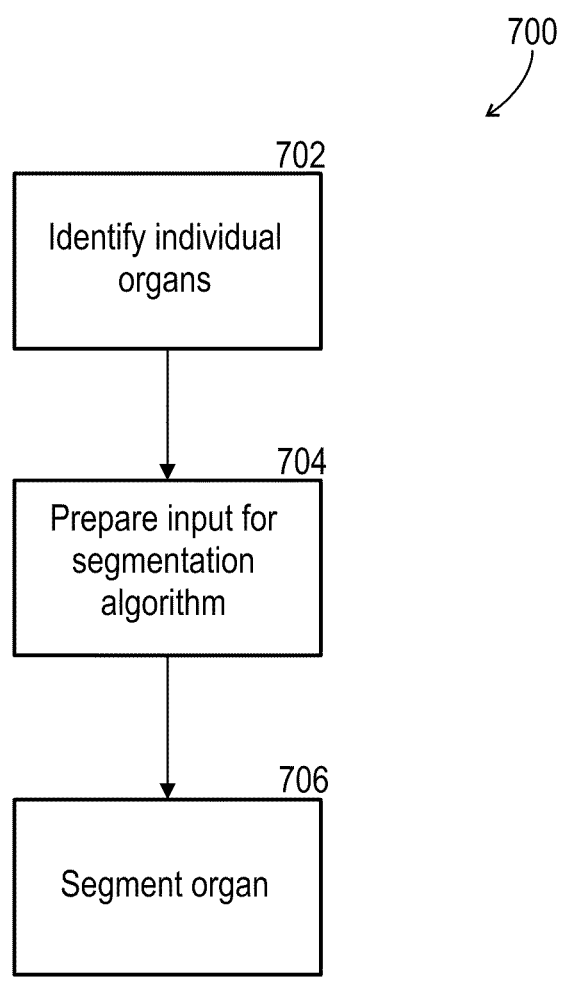
FIG. 7 is a flow chart showing more details of applying a segmentation algorithm to the detected tissues, in the flow chart of FIG. 1, according to an exemplary embodiment of the invention.

FIG. 7 shows a flow chart 700, with further details of how the organ or organs are segmented at 116. At 702, the type of organ is identified which the graph is associated with, and an appropriate segmentation algorithm is chosen. For example, if the graph is of artery landmarks, or vein landmarks, then a blood vessel segmentation algorithm may be used. A suitable blood vessel segmentation algorithm may be that described in PCT/IL2004/001168, or any other blood vessel segmentation algorithm known in the art may be used. For other types of organs, different segmentation algorithms are optionally used, as known in the art.

At 704, input for the segmentation algorithm is prepared. In the case of a blood vessel segmentation algorithm on a vessel tree, for example, the appropriate input may be the output of a Depth First Search algorithm, which, for each leaf, stores a list of the identified voxels of the graph leading from a root of the tree to that leaf. The segmentation algorithm may be run separately for different leaves, each time using the list of identified voxels leading to that leaf. Different types of input may be needed for segmenting other types of organs, for which the graph may not be a tree. At 706, the organ, or connected set of organs, is segmented.

Figure 8:
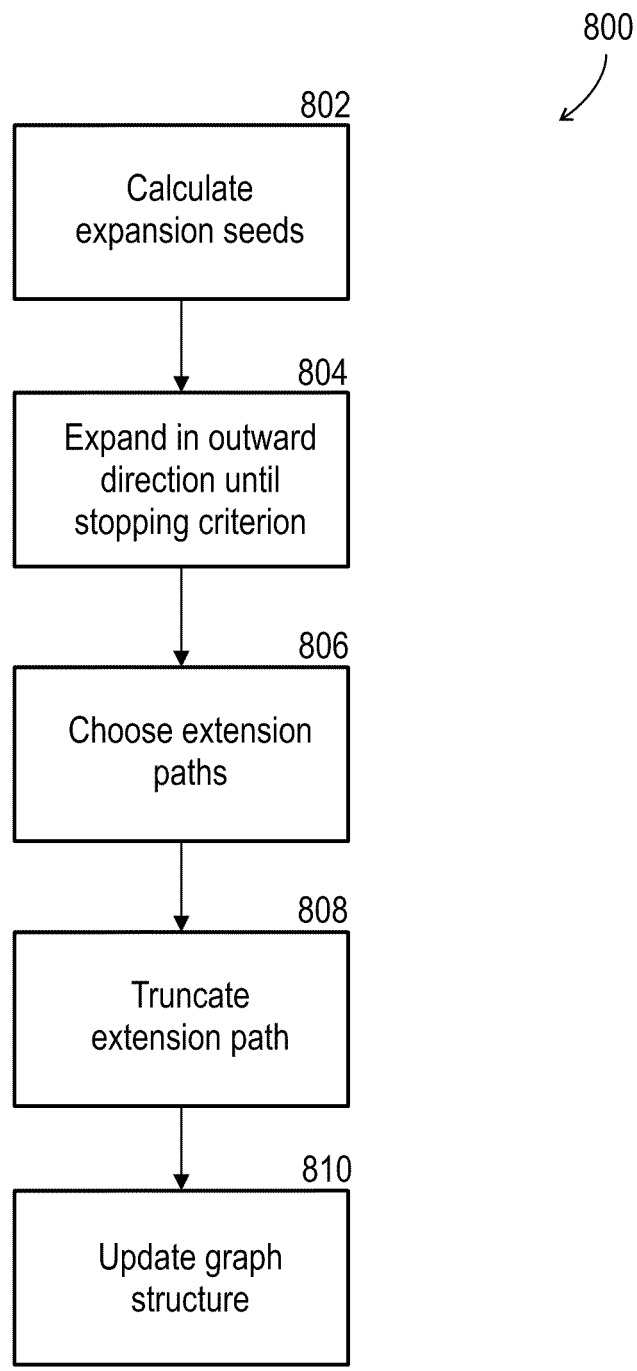
FIG. 8 is a flow chart showing more details of detecting and segmenting adjacent tissues, in the flow chart of FIG. 1, according to an exemplary embodiment of the invention.

FIG. 8 shows a flow chart 800, with further details of how additional organs, which need not be located close to bones, are segmented at 118. At 802, appropriate seed voxels are optionally found for organs that are connected to organs that were already segmented, for example voxels located near the points where specific arteries join the aorta.

At 804, the organs to be segmented are expanded out from the seed voxels, for example using a fast marching algorithm. Voxels that are located in organs that have already been segmented may be excluded. Different stopping criteria for the expansion may be used, depending on the organ being segmented. In the case of arteries in the abdomen, for example, the stopping criterion may depend on the geodesic distance over the path followed by the expansion from the aorta. Measures such as "vesselness," and the local diameter of the vessel, which may be inferred from the eigenvalues of the Hessian matrix at different values of spatial filtering, or from principal component analysis, may also be used in the stopping criterion, with the expansion stopped if the voxels no longer have high "vesselness," or if the vessel diameter appears to be smaller than expected for that blood vessel.

At 806, some of the voxels of the expansion are optionally discarded, while others are kept. For example, shorter side branches of a branching structure are optionally discarded, using the persistency of minima of the negative of the geodesic distance, as described above for 610.

At 808, paths of the expansion are optionally examined, to see whether some of them may have leaked into different adjacent organs, and those paths are optionally truncated. A decision whether to truncate a path optionally depends on one or more of the following parameters: 1) length of the path; 2) integral of image density along the path, starting from the seed; 3) the diameter of the segmentation around the path; and 4) a measure indicating whether the path is in the organ that it is supposed to be in, for example vesselness in the case of blood vessels. If the length of the path is greater than a maximum path length expected for this organ, that may indicate that the path is no longer within the organ and should be truncated. A fairly abrupt change in image density, occurring at the same place as a fairly abrupt change in the diameter of the segmentation around the path, may indicate that the path has passed into a different organ. A significant drop in a measure, such as vesselness, used to indicate whether the path is in the organ, may indicate that the path has left the organ. In a case where the organ is an artery, a gradual increase in segmentation diameter may indicate that the path has left the artery and gone into a vein, or into a large organ such as a kidney, if the path is supposed to be going in the direction of blood flow, along which arteries would typically become narrower. If a contrast agent is being used in the artery, then a sharp decrease in image density along the path might also provide evidence that the path has gone from an artery to a vein or another organ.

At 810, the end points of the expansion and the seeds are added to the graph structure, together with the connection between them, and may be used later as in flow chart 700 to segment the entire organ.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions, illustrate some embodiments of the invention in a non limiting fashion.

Figure 9:
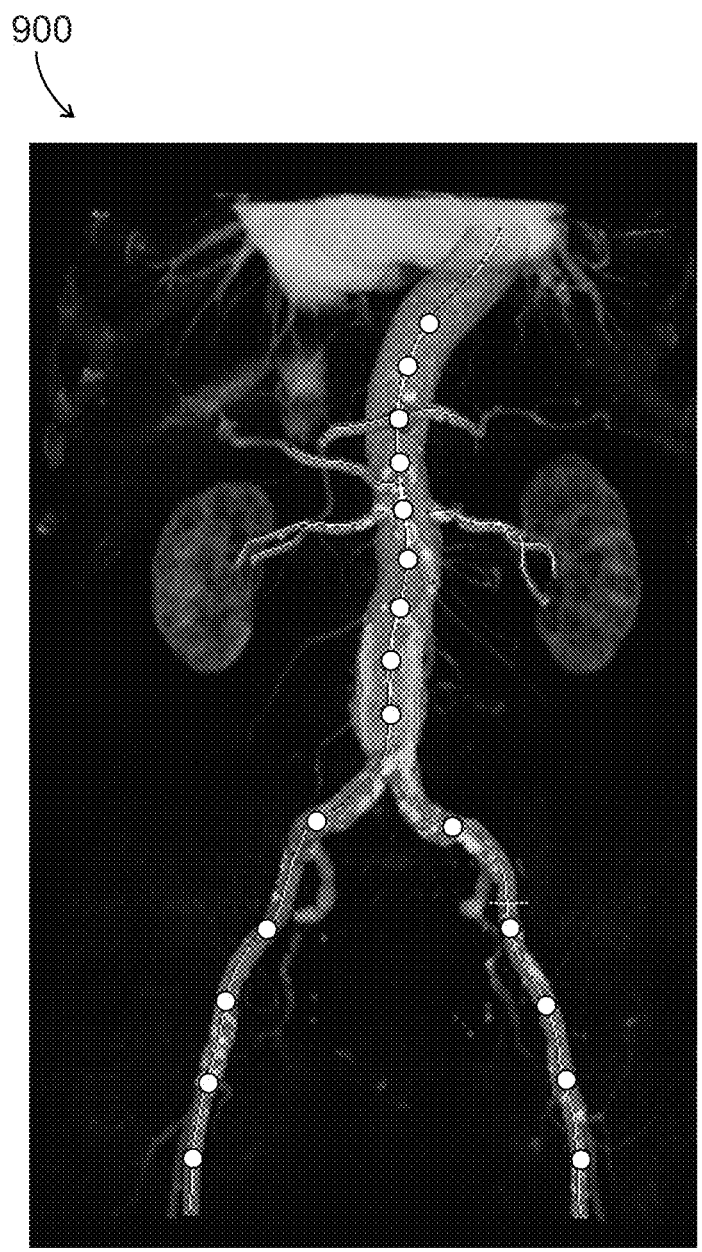
FIG. 9 schematically shows a medical image that has been segmented by an algorithm according to an exemplary embodiment of the invention.

FIG. 9 shows a segmented medical image, produced using an algorithm that finds landmarks in the aorta and iliac arteries, using a bone atlas to define the positions of the landmarks in relation to nearby vertebrae and other bones. The landmarks are indicated by solid white circles. A solid white line indicates the centerlines of the aorta and iliac arteries. Once the aorta and iliac arteries were segmented, seed voxels at appropriate places along the outside of the aorta were used to segment the renal arteries, hepatic artery, celiac artery, and splenic artery, out to a geodesic distance of 125 mm from the aorta. The parameters used were those described above.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of automatically segmenting one or more soft tissue organs in a first 3-D medical image, by circuitry executing instructions on a computer, the method comprising:
    a) registering the image to a bone atlas that lists identified bones, establishing which voxels in the image correspond to which voxels in the bone atlas, which also lists landmarks of the soft tissue organs, the landmarks having defined locations with respect to features of bones listed in the atlas, and lists the landmarks' spatial relationship to the bones, using an apparatus comprising an input interface for receiving the image as data in a memory or a data storage medium of the computer, and a registration module of the circuitry configured for registering the image by processing the data;
    b) identifying one or more bones in the registered image by the circuitry executing the instructions, based on the registration of the image to the bone atlas and on the identification of the bones in the bone atlas;
    c) identifying a plurality of voxels in the image as corresponding to at least some of said landmarks of the organs listed in the bone atlas, by the circuitry executing the instructions, based on positions of the voxels relative to said one or more identified bones in the registered image, and on the landmarks' spatial relationship to the bones listed in the bone atlas; and
    d) segmenting at least one organ in the image using at least one of the voxels in the image identified as belonging to that organ as a starting point, using a segmentation algorithm implemented in the instructions executed on the computer;
wherein the image was acquired from the body of a subject using a medical imaging device.

2. A method according to claim 1, wherein the one or more organs comprise an artery.

3. A method according to claim 2, wherein the one or more organs comprise one or more of an aorta, an iliac artery, a femoral artery, and a tibial artery.

4. A method according to claim 1, wherein the one or more organs comprise a liver.

5. A method according to claim 1, wherein the one or more organs comprise airways.

6. A method according to claim 1, wherein the one or more organs comprise a spinal canal.

7. A method according to claim 1, wherein the one or more organs comprise a branching structure.

8. A method according to claim 1, wherein identifying the plurality of voxels comprises, for at least one of the voxels, using one or more of dimensions, shape, orientation and symmetry properties of the organ that the voxel is identified as corresponding to.

9. A method according to claim 1, wherein the atlas lists path connections between at least some of the landmarks, identifying voxels corresponding to listed landmarks comprises identifying voxels corresponding to landmarks that are connected by path connections listed in the atlas, and the method also comprises finding one or more paths in the first image connecting the voxels identified as corresponding to landmarks that are connected by path connections listed in the atlas, by the circuitry executing the instructions.

10. A method according to claim 9, also comprising assigning a weight to each path according to an extent to which the image along the path has one or more properties expected for a path passing only through the organ or organs that those voxels were identified as belonging to.

11. A method according to claim 10, also comprising reviewing the identification of the voxels, and correcting the identification of a voxel if the weight of one or more paths connecting it indicates that the path does not pass only through the organ or organs that the voxels connected by the path were identified as belonging to.

12. A method according to claim 9, also comprising finding at least one path connecting two voxels that are identified as corresponding respectively to two landmarks that have a path connection to a third landmark in the atlas, even though said two landmarks do not have a path connection to each other in the atlas.

13. A method according to claim 9, wherein the connections and landmarks listed in the atlas for one or more organs comprise a tree structure with each connection leading from a parent landmark to a child landmark.

14. A method according to claim 13, also comprising finding a path from at least one voxel identified with a landmark that has no child landmarks within the image, using an expansion algorithm that allows the path to extend in any direction within a range of directions that includes an average direction of a last part of the path before said voxel, but does not allow the path to expand in any direction within a range of directions that includes a direction opposite to said average direction.

15. A method according to claim 9, also comprising displaying at least part of one of the paths to a user.

16. A method according to claim 9, also comprising:
a) registering a second 3-D medical image, showing an anatomical region at least partly corresponding to an anatomical region shown in the first image, to the bone atlas;
b) identifying in the second image a plurality of voxels corresponding to the same listed landmarks as those corresponding to identified voxels in the first image for which connecting paths were found;
c) finding one or more paths in the second image connecting said identified voxels in the second image; and
d) using at least one of the paths found in the second image that connects identified voxels in the second image, and the path found in the first image that connects the corresponding identified voxels in the first image, to register at least a portion of the second image to the first image.

17. A method according to claim 9, also comprising checking said segmentation of at least one organ, or checking another segmentation of at least one organ in the image, by checking to see whether at least one of the paths is entirely located within the segmentation that is being checked.

18. A method according to claim 9, wherein segmenting the at least one organ comprises using at least one voxel on one of the paths found, between the connected voxels, as a seed voxel.

19. A method according to claim 1, also comprising:
a) registering a second 3-D medical image, showing an anatomical region at least partly corresponding to an anatomical region shown in the first image, to the bone atlas;
b) identifying in the second image a plurality of voxels corresponding to the same listed landmarks as those corresponding to identified voxels in the first image for which connecting paths were found; and
c) using at least one of the identified voxels in the second image, and the corresponding identified voxels in the first image, to register at least a portion of the second image to the first image.

20. A method according to claim 1, wherein the atlas lists connections indicating relationships between properties of the landmarks, the method also comprising:
a) assigning a weight to each connection according to how much said properties of the voxels identified as corresponding to said landmarks follow the relationship indicated in the atlas for that connection;
b) reviewing the identification of the voxels, correcting the identification of a voxel if the weight of one or more connections to it indicates that the properties of the voxels do not have the relationship that would be expected if the identifications were correct.

21. A method according to claim 1, also comprising, for at least one identified voxel, segmenting at least one additional organ that is connected to the organ to which the identified voxel belongs, by a path that is within the image.

22. A method according to claim 1, also comprising, for at least one identified voxel, segmenting at least one additional organ, adjacent to the organ to which the identified voxel belongs, or adjacent to an organ connected to the organ to which the identified voxel belongs by a path that is within the image.

23. A method according to claim 1, wherein identifying the plurality of voxels comprises, for at least one of the voxels, using one or more of an expected image density of the organ, an expected image density of the tissue at the location of the corresponding landmark, and a range of probable image densities of the tissue at the location of the corresponding landmark.

24. A method according to claim 1, comprising producing a segmented image of the at least one organ from results of the segmenting of the at least one organ.

* * * * *